(12) United States Patent
Cackley et al.

(10) Patent No.: US 12,240,370 B2
(45) Date of Patent: Mar. 4, 2025

(54) CORNER CUP

(71) Applicant: Jaeger-Unitek Sealing Solutions, Inc., LaPorte, IN (US)

(72) Inventors: Jason Cackley, South Bend, IN (US); Scott Koppen, Wanatah, IN (US); Kevin Casey, New Buffalo, MI (US)

(73) Assignee: Jaeger-Unitek Sealing Solutions, Inc., LaPorte, IN (US)

( * ) Notice: Subject to any disclaimer, the term of this patent is extended or adjusted under 35 U.S.C. 154(b) by 181 days.

(21) Appl. No.: 18/197,817

(22) Filed: May 16, 2023

(65) Prior Publication Data

US 2023/0365050 A1 Nov. 16, 2023

Related U.S. Application Data

(60) Provisional application No. 63/342,290, filed on May 16, 2022.

(51) Int. Cl.
*B60P 3/34* (2006.01)
*B60J 10/25* (2016.01)
*B60P 3/36* (2006.01)

(52) U.S. Cl.
CPC ............... *B60P 3/36* (2013.01); *B60J 10/25* (2016.02); *B60P 3/34* (2013.01)

(58) Field of Classification Search
None
See application file for complete search history.

(56) References Cited

U.S. PATENT DOCUMENTS

| | | |
|---|---|---|
| 6,527,278 B1 | 3/2003 | Norris |
| 7,614,676 B2 | 11/2009 | Ksiezopolski et al. |
| 7,614,677 B2 | 11/2009 | Ksiezopolski et al. |
| 7,651,144 B2 | 1/2010 | Clark et al. |
| 8,366,168 B1 | 2/2013 | Ksiezopolski et al. |
| 8,382,124 B2 * | 2/2013 | Ksiezopolski ........... B60J 10/00 277/642 |
| 8,408,625 B1 | 4/2013 | Ksiezopolski et al. |
| 8,701,351 B2 | 4/2014 | Siegel |
| 8,875,443 B2 | 11/2014 | Siegel |
| 8,910,422 B2 | 12/2014 | Siegel |
| 9,038,322 B2 | 5/2015 | Ksiezopolski |
| 9,045,027 B2 | 6/2015 | Young et al. |
| 9,505,357 B2 | 11/2016 | Ksiezopolski |
| 9,533,629 B2 | 1/2017 | Ksiezopolski et al. |
| 9,625,037 B2 | 4/2017 | Young et al. |
| 9,702,468 B2 | 7/2017 | Newhouse |
| 9,796,321 B2 | 10/2017 | Ksiezopolski et al. |
| 9,879,778 B2 | 1/2018 | Goode |
| 9,889,803 B1 | 2/2018 | Newman |
| 10,065,553 B2 | 9/2018 | Goode |
| 10,065,580 B1 | 9/2018 | Newman |
| 10,208,860 B2 | 2/2019 | Young et al. |
| 10,501,026 B2 | 12/2019 | Ksiezopolski et al. |
| 11,318,827 B1 * | 5/2022 | Maloney ................. B60J 10/00 |

(Continued)

*Primary Examiner* — Joseph D. Pape
(74) *Attorney, Agent, or Firm* — Vedder Price P.C.

(57) ABSTRACT

The corner cup comprises a base, first and second trough, angled lip, side wall, rear wall, wedge, and rib system. The troughs are located on opposing sides of the corner cup and redirect excess liquid away from the RV. The rib system provides a means for the base to rest at a sloped angle and allow excess water to drain away from the RV.

11 Claims, 19 Drawing Sheets

(56) References Cited

U.S. PATENT DOCUMENTS

| | | |
|---|---|---|
| 2006/0091687 A1 | 5/2006 | Schoffner et al. |
| 2012/0032406 A1 | 2/2012 | Ksiezopolski et al. |
| 2016/0201893 A1 | 7/2016 | Ksiezopolski |
| 2016/0243974 A1 | 8/2016 | Goode et al. |
| 2018/0043844 A1* | 2/2018 | Ksiezopolski ......... F16J 15/027 |
| 2020/0317143 A1 | 10/2020 | Goode |

* cited by examiner

CORNER CUP

CROSS-REFERENCE TO OTHER APPLICATIONS

This application claims the benefit of a priority to U.S. Provisional Application No. 63/342,290 filed May 16, 2022, the contents of which are incorporated by reference.

FIELD OF THE DISCLOSURE

The present disclosure generally relates to the field of recreational vehicles. More particularly, the disclosure is directed to a device to improve water sealing for a slide out room of a recreational vehicle.

BACKGROUND OF THE INVENTION

Slide out rooms are a common feature in recreational vehicles ("RV") in order to increase the volume of interior space. However due to the nature of operating a slide out room, many devices struggle to provide an effective seal for the slide out rooms in both the retracted and extended state. In some instances, RV's have used wiper seals and bulb seals to seal slide out rooms when retracted and extended.

Generally, it is desired that slide out rooms have a mechanism capable of completely sealing the corners of the slide out room to prevent the leakage of water, wind, and light.

However, the current models of retractable RV slide out rooms use seals such as extruded seals, wiper seals and bulb seals. These seals have failed to completely seal the corners of the slide out rooms. The current market generally complements these seals with corner cups which facilitate water movement from the sealing system to the lower right and lower left corners in order to avoid water intrusion into the RV. Unfortunately, these models often fail to completely seal the corners or provide an effective drain for excess water. In particular, the combination of traditional seals and two cups described above fail to significantly decrease the potential for leakage of light, wind, and water into the RV.

There exists a need in the marketplace, therefore, for a solution that provides a more effective seal and drain system for a slide out room which is capable of draining the excess water outside and away from the interior of the RV to prevent light, wind, and rain from leaking into an RV.

SUMMARY OF THE INVENTION

The present disclosure generally relates to a pair of corner cups which provide a tray design which is shaped to fit the shape of the slide out column and includes a trough system capable of capturing residual water and draining it out from the RV sealing system.

In an embodiment, the corner cup includes a base, first and second trough, angled lip, side wall, rear wall, drain, wedge, and rib system. The base is sloped comprised of a length, width, and thickness of material and is sized to fit RV's of all sizes. The first and second troughs ensure that any residual water will be captured and run out of the cup. The troughs are recessed by slopes into opposing sides of the sloped base which create a channel for residual water to flow freely out of the RV sealing system. The base connects to a wedge which comprises an L shape, with a portion extending downward from the base and a portion extending horizontally outside and away from the side wall. The bottom of the base comprises a rib system to ensure that the underside of the cup will always be sloped away from the interior of the slide room and ensuring that water will not pool in the cup and instead run out from the cup.

In one advantage of the present disclosure the angled lip allows for the Flip 'N Seal™ RV Sealing Bottom Pan to mate with the corner cup. Additionally, the rigidity of the material and slope of the bottom surface of the base directs the water out and away from the RV sealing system to effectively drain any excess water.

DETAILED DESCRIPTION OF THE DISCLOSURE

Figure 1:
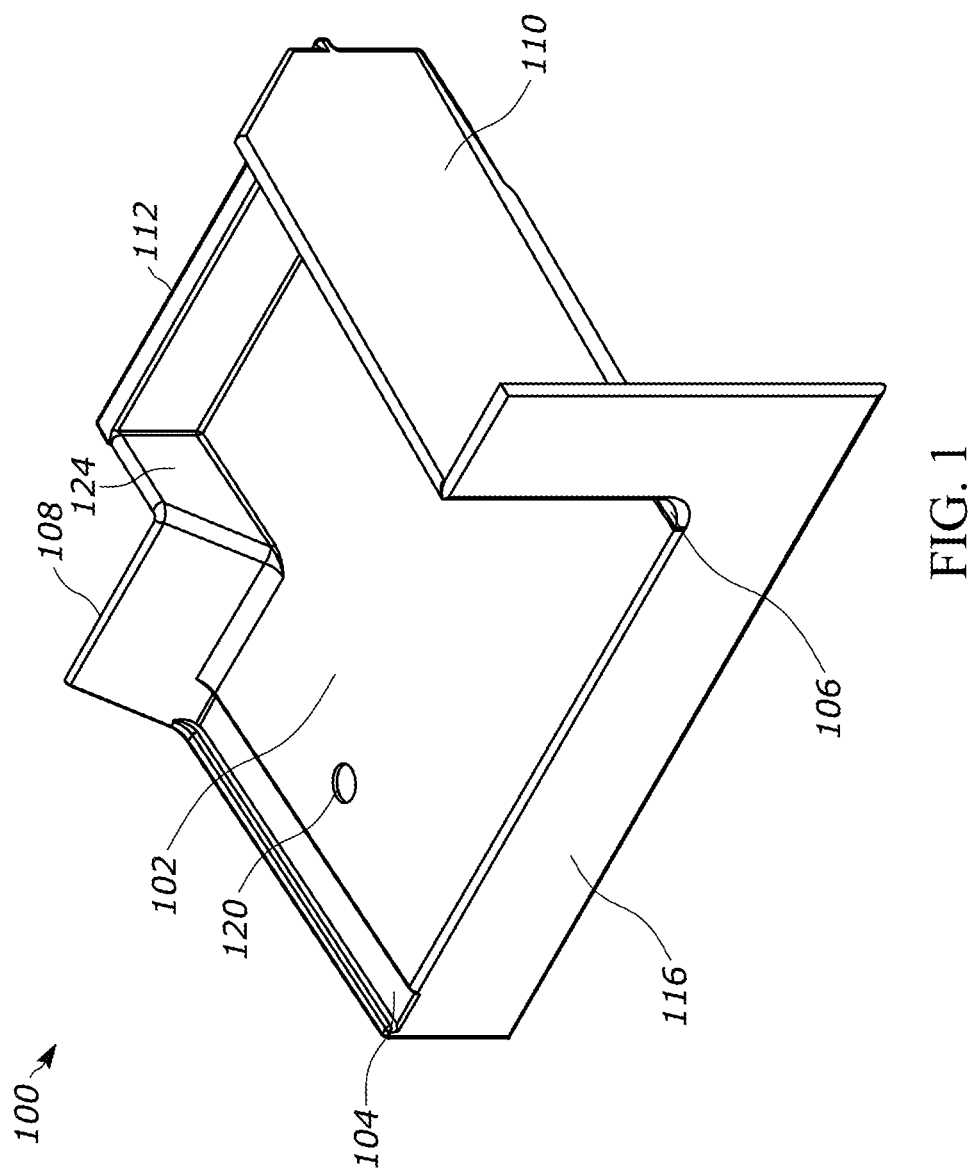
FIG. 1 is a perspective view of the corner cup in accordance with a first embodiment of the present disclosure.
Figure 2:
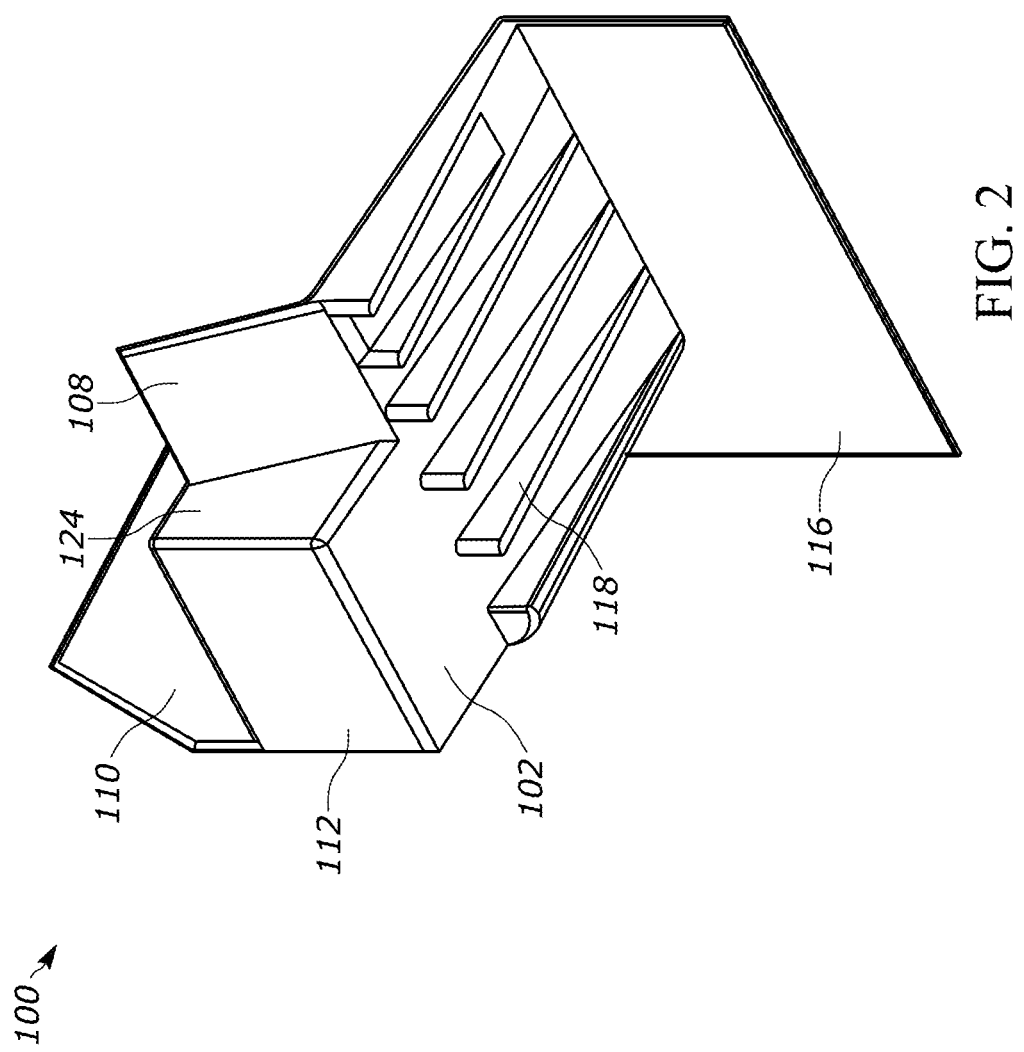
FIG. 2 is a second perspective view of the underside of the corner cup in accordance with a first embodiment of the present disclosure.
Figure 3:
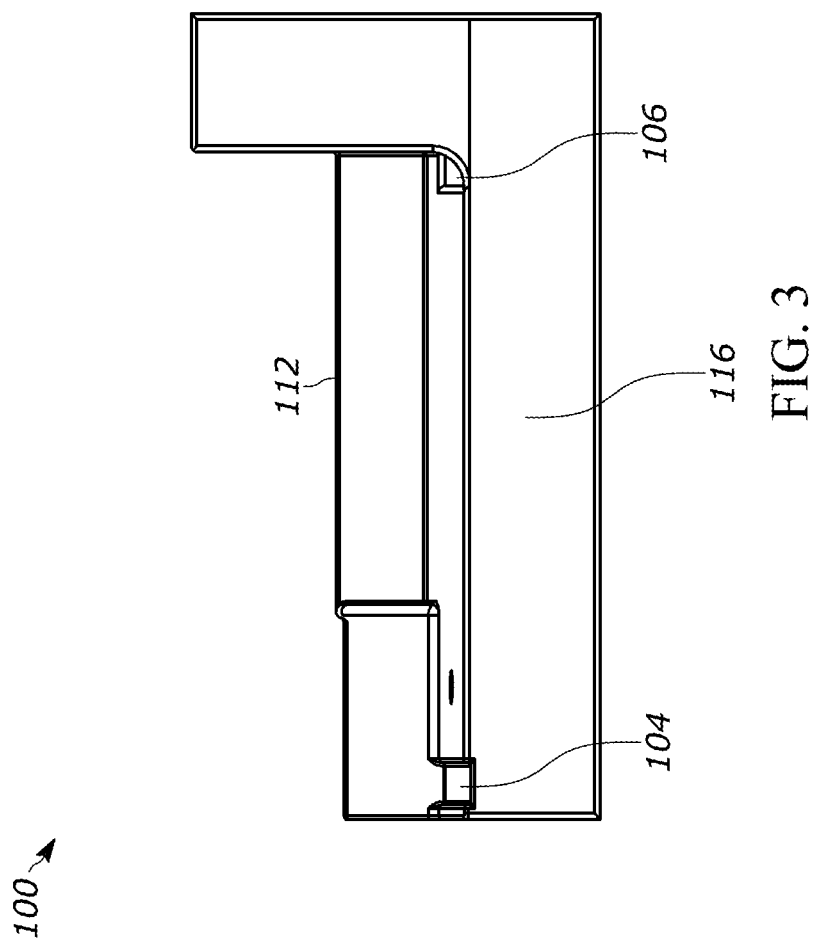
FIG. 3 is a front view of the corner cup shown in FIG. 1.
Figure 4:
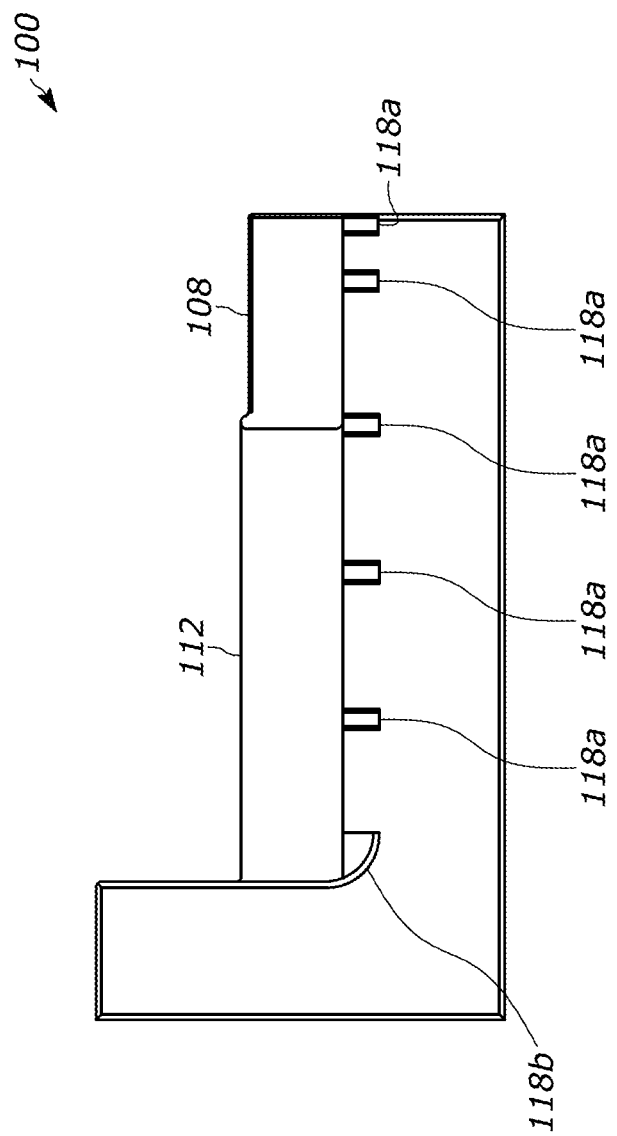
FIG. 4 is a rear view of the corner cup shown in FIG. 1.
Figure 5:
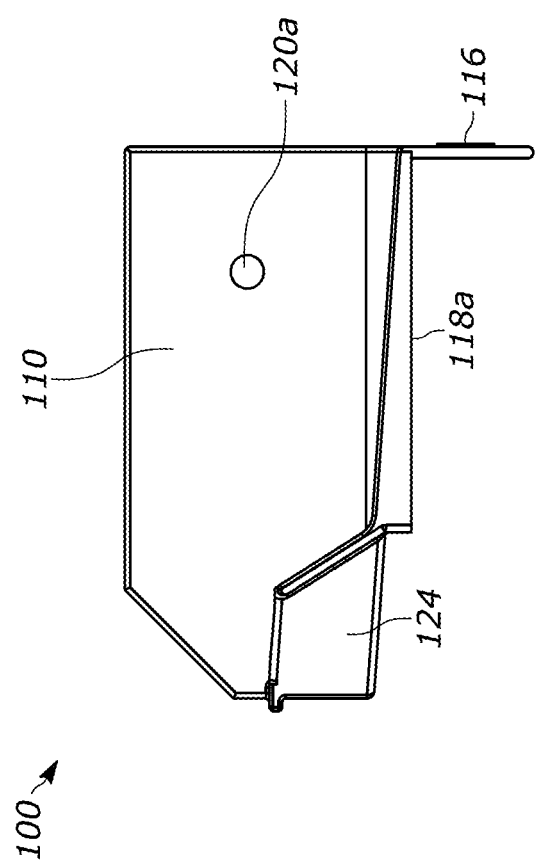
FIG. 5 is a side view of the corner cup shown in FIG. 1.
Figure 6:
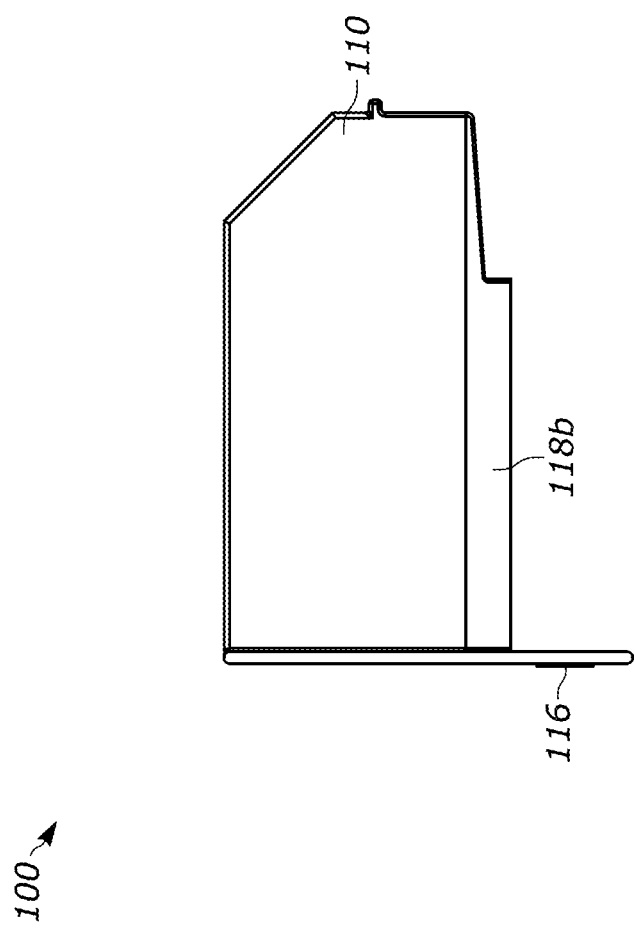
FIG. 6 is an opposite side view of the corner cup shown in FIG. 5.
Figure 7:
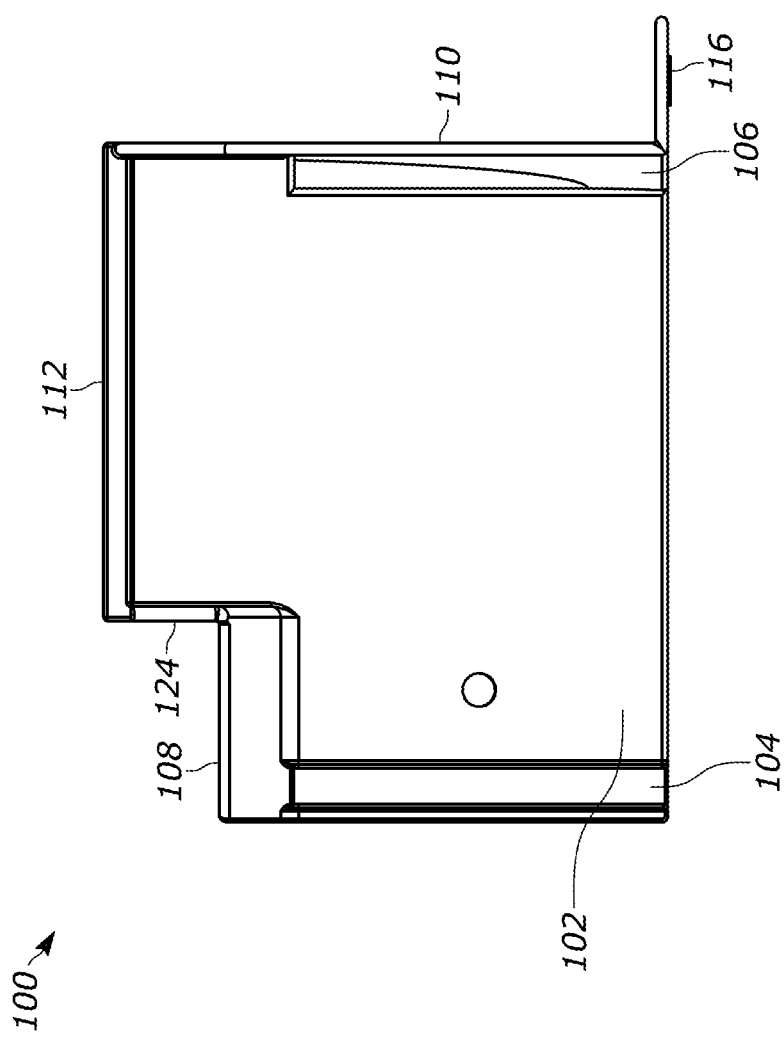
FIG. 7 is a top view of the corner cup shown in FIG. 1.
Figure 8:
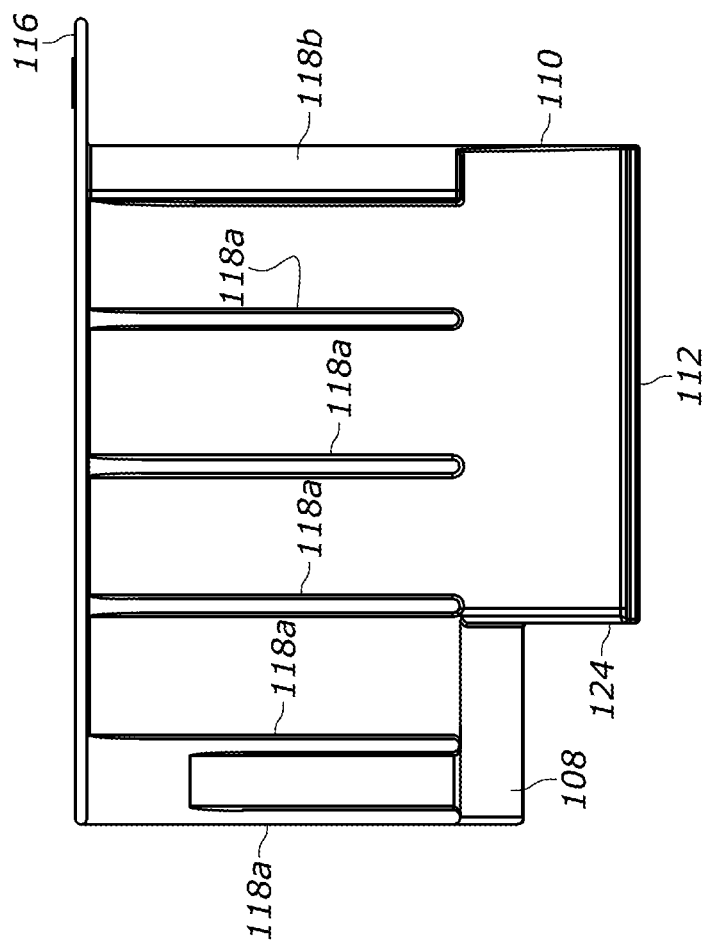
FIG. 8 is a bottom view of the corner cup shown in FIG. 1.

FIGS. 1-8 show a first embodiment of a corner cup 100 in accordance with the present disclosure. The corner cup improves upon the functionality of a standard corner cup design. The corner cup 100 comprises a base 102, first and second trough 104,106, angled lip 108, side wall 110, rear wall 112, wedge 116, and rib system 118.

In an embodiment, the corner cup 100 may further comprise a hole 120, 120a for a fastener 122, 122a.

In the embodiment shown in FIGS. 1-8, the corner cup 100 is installed as part of a RV slide out room system. The corner cup 100 itself provides a portion of the RV sealing system for the slide out room and facilitates movement of water away from the RV to prevent leaks. The corner cup is sized to be used in conjunction with multiple RV wall sizes.

The corner cup 100 comprises a smooth, sloped base 102. The base 102 is comprised of a length, width, and thickness of material and is shaped to provide a seat for the slide out room. The base 102 is a polygon having a top and bottom, as well as front, rear, left and right sides. The opposing left and right sides connect to a first and second trough 104,106 respectively. The opposing rear and front sides connect to a rear wall 112 and wedge 116 respectively. In an embodiment, and as shown in FIG. 1, the rear side of the base 102 comprises a double L shape. The double L shape is formed by two separate rear wall sections 112, 108 located at different distances from the front side of the base 102 which are connected by a third wall portion 124. The rear wall 112 and third wall 124 form a first L shape. The angled lip 108 and third wall 124 form the second L shape. The base 102 is sloped to facilitate the movement of water away from the RV to prevent leaks. In alternative embodiments, the base 102 is square or rectangular in shape. In alternative embodiments, the base 102 lies flat along a horizontal axis without a slope.

The base 102 of FIGS. 1-8 is comprised of a plastic, plastic resin, metal, metal alloy, composite, or combination thereof or other similarly situated materials. In an embodiment, the base 102 is comprised of high-modulus plastic resin.

In an embodiment, the base 102 is shaped to accommodate any RV Sealing Systems. In an embodiment the base 102 comprises 3.1 in. in length from the front to rear side of the base. In this embodiment, the base 102 comprises 2.6 in. in width along the rear wall 112 section.

Historically, the RV cups in the market included a flat horizontal base surface which does not create a "waterless" cup design. As a result, water is not properly channeled out of the RV. In addition, due to the lack of rigidity of the materials and inadequate slope on the bottom surface of the base, the water flows backwards and directly into the RV, contrary to the cup's purpose. The present disclosure includes several additional features which provide advantages over the prior art.

In the embodiment of FIGS. 1-8, the first and second troughs 104,106 ensure that any residual water will be captured and run out of the cup. The troughs 104,106 are recessed by slopes into opposing right and left sides of the horizontal base 102 and create a channel for residual water to flow freely out of the RV sealing system. In an embodiment, the troughs 104,106 are comprised of the same material as the base 102.

The troughs 104,106 extend from the front of the base to toward the rear wall 112. In an embodiment, the troughs 104,106 are 2.0 in. in length from the front of the base 102 to the back. In an alternative embodiment, the troughs 104,106 are 3.0 in. in length from the front of the base 102 to the back.

Figure 9:
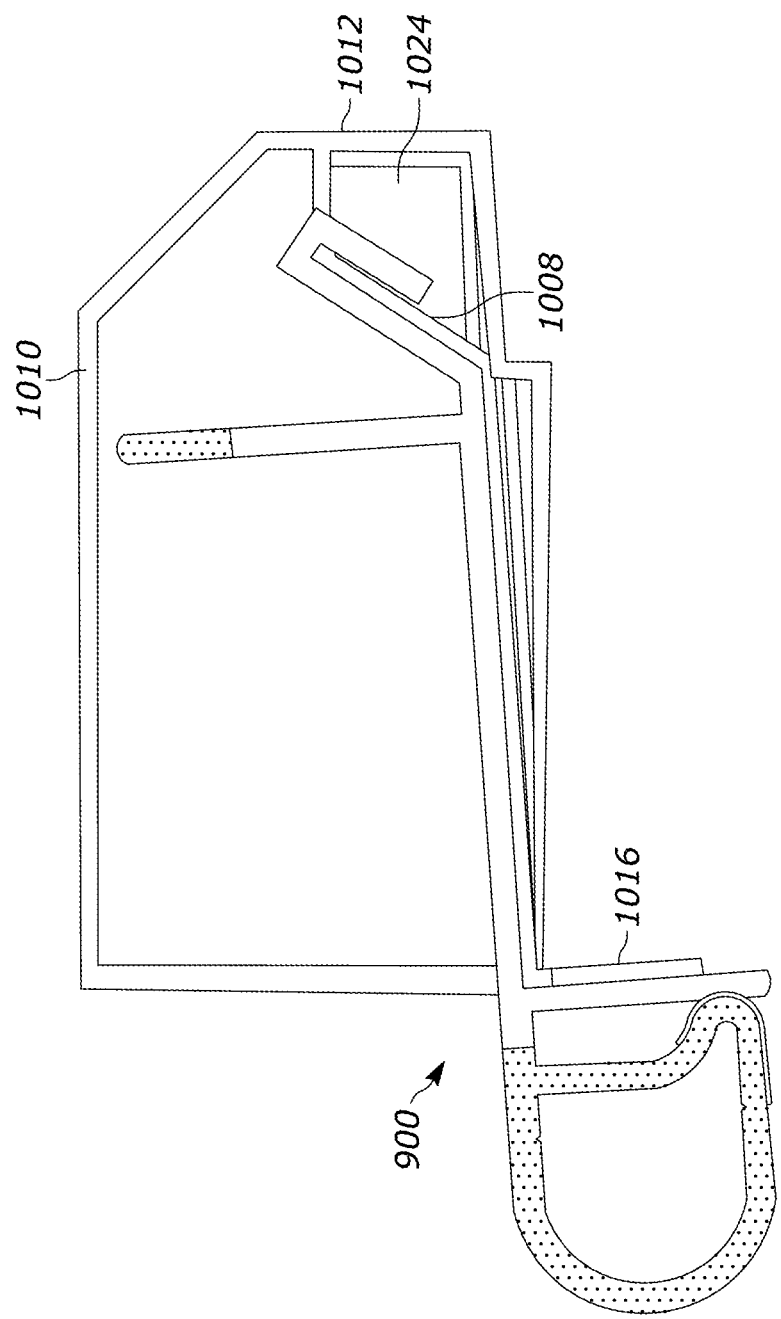
FIG. 9 is a side view of the Flip 'N Seal™ RV Sealing Bottom Pan interacting with the angled lip of the corner cup.

In the embodiment of FIGS. 1-8, the rear side of the base 102 connects to a rear wall 112. The rear wall 112 extends generally vertically from the horizontal plane of the base 102. The distance between the front of the base 102 and rear wall 112 is sized to capture and drain runoff water for an RV slide out room system of all sizes. Generally, the base 102 of the corner cup 100 is long enough in length to extend from the exterior wall of the RV to the interior of the RV. In an embodiment, the rear wall 112 is comprised of a single, straight-edged wall unit. In an embodiment, the rear wall 112 comprises a double L shape having multiple wall sections as shown in FIG. 1. The double L shape is formed by two separate rear wall sections 112,108 located at different distances from the front side of the base 102 which are connected by a third wall portion. In an embodiment, a portion of the rear wall 112 comprises an angled lip 108 which extends at least along a portion of the rear wall. The angled lip 108 forms an angle such that the top portion of the angled lip 108 is further from the front side of the base 102 than the bottom portion of the angled lip 108 is from the front side of the base 102. As shown in FIG. 9, the angled lip 108 allows for the Flip 'N Seal™ RV Sealing Bottom Pan to mate with the cup.

The rear wall 112 extends along the entire width of the base 102. In an embodiment, the rear wall 112 runs a length of 2.6 in. along the back width of the base 102. In an alternative embodiment, the rear wall 112 runs a length of 2.75 in. along the back width of the base 102.

The rear wall 112 of FIGS. 1-8 is comprised of a plastic, plastic resin, metal, metal alloy, composite, or combination thereof or other similarly situated materials. In an embodiment, the rear wall 112 is comprised of high-modulus plastic resin.

In the embodiment of FIGS. 1-8, the base 102 connects to a side wall 110, which extends horizontally along the edge of the base 102 and vertically in an upward direction before connecting to the rear wall 112. In an embodiment, the side wall 110 is larger in height than the rear wall 112. As shown in the embodiment of FIG. 1, the side wall 110 comprises a sloped portion near the rear side of the base 102 wherein the side wall 110 slopes in a partially downward direction toward the rear wall 112. In an alternative embodiment, the side wall 110 comprises a consistent length, width, and thickness.

The side wall 110 extends along the entire length of the base 102. In an embodiment, the side wall 110 runs a length of 3.0 in. along the length of the base 102. In an alternative embodiment, the side wall 110 runs a length of 2.0 in. along the length of the base 102.

The side wall 110 of FIGS. 1-8 is comprised of a plastic, plastic resin, metal, metal alloy, composite, or combination thereof or other similarly situated materials. In an embodiment, the side wall is comprised of high-modulus plastic resin.

In the embodiment of FIGS. 1-8, the base 102 connects to a wedge 116 which comprises an L shape with one portion of the L connecting to the side wall 112 near the front side of the base 102 and one portion of the L connecting to the front side of the base 102. The wedge 116 includes a portion extending downward from the base 102 and a portion extending horizontally away from the side wall 110. The wedge 116 is shaped to provide an end to the corner cup 100 which allows the base 102 to rest horizontally along the floor of the slide out column while the interior of the wedge 116 is flush along the exterior walls of the RV.

The wedge 116 extends along the front side width of the base 102. In an embodiment, the wedge 116 runs a length of 4.5 in. along the front side of the base 102. In an alternative embodiment, the wedge 116 runs a length of 4.0 in. long the front side of the base.

The wedge 116 of FIGS. 1-8 is comprised of a plastic, plastic resin, metal, metal alloy, composite, or combination thereof or other similarly situated materials. In an alternative embodiment, the wedge 116 is comprised of high-modulus plastic resin.

In the embodiment of FIGS. 1-8, the bottom of the base 102 comprises a rib system 118 to ensure that the underside of the cup will be sloped away from the interior of the slide out room to ensure that water will not pool in the cup and will instead run out from the cup. The addition of the rib system 118 achieves significant improvements in terms of strength and function of the corner cup 100 and allows for universal application of the corner cup 100, including with RV walls of greater than 2" in width. In particular, the waterless design, increased stiffness/durability and high compression strength for improved load bearing performance of the corner cup 100 are the result of the rib system 118.

The rib system 118 comprises a plurality of raised protrusions 118a extending from the bottom of the base 102 and beginning from the front end of the base 102, near the wedge 116 side. The protrusions 118a extend horizontally toward the rear side of the base 102 and vertically in the downward direction. As the protrusions extend horizontally along the base 102, the vertical extension of the protrusions 118a increase in size, which form a triangular profile. The triangular profile provides a slope along the base 102 when the corner cup is placed inside the RV. In an embodiment an additional protrusion 118b extends beneath the second trough 106 in the form of a quarter-circle profile. Similar to the triangular profile protrusions 118a, the vertical extension of the additional protrusion 118b increases in size as it extends horizontally along the base 102. In an embodiment, the protrusions 118a do not extend the entire length of the base 102 and extend to a position proximate the portion of the base 102 which connects to the angled lip 108. In an alternative embodiment, the protrusions extend the entirety of the base 102 toward the rear wall 112. In a second alternative embodiment, the rib system 118 comprises a single protrusion which extends the width of the bottom of the base portion 102.

In the embodiment of FIGS. 1-8, the rib system 118 comprises protrusions which form a triangular shape with the base 102 of the corner cup 100. In an alternative embodiment, the protrusions of the rib system 118 form a conic or semispherical shape extending from the base 102 of the corner cup 100.

In an embodiment, the ribs 118a, 118b of the rib system 118 run a length of 2.1 in. along the length of the underside of the base 102. In an alternative embodiment, the ribs 118a, 118b of the rib system 118 run a length of 3.0 in. along the length of the underside of the base 102.

The ribs 118a, 118b of the rib system 118 of FIGS. 1-8 are comprised of a plastic, plastic resin, metal, metal alloy, composite, or combination thereof or other similarly situated materials. In an embodiment, the ribs 118a, 118b of the rib system 118 are comprised of high-modulus plastic resin.

Figure 10:
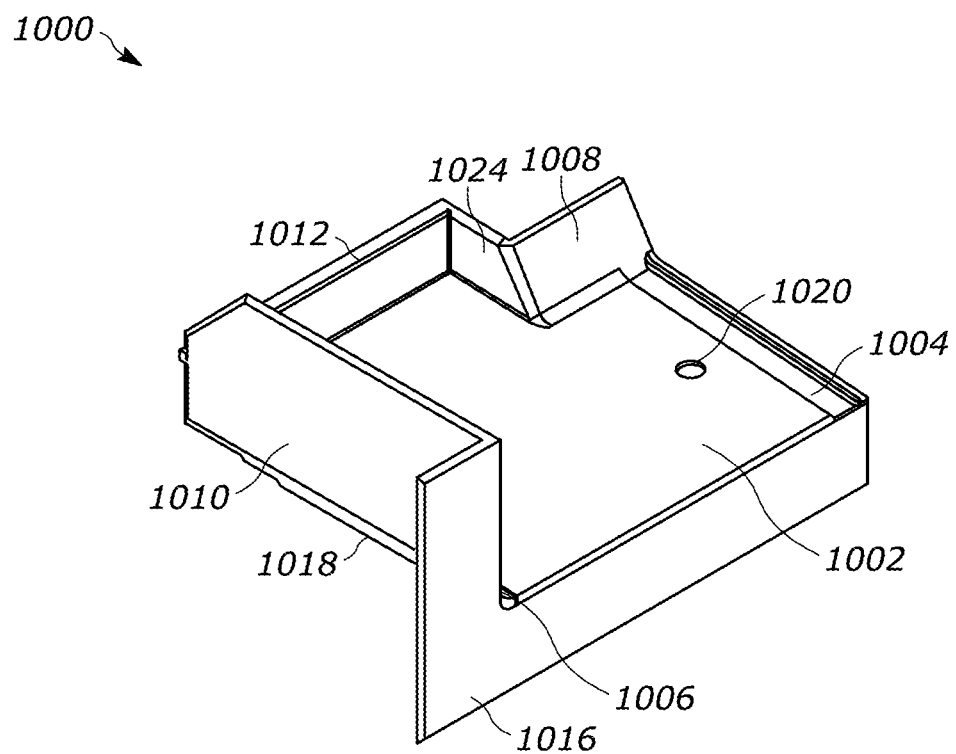
FIG. 10 is a perspective view of a second corner cup for use in a second, opposite corner of the RV.

FIG. 10 shows a second corner cup 1000 for use in an opposite corner of the RV slide out room. The elements of the second corner cup 1000 are identical to the corner cup 100 shown in FIG. 1, except the elements of the device are mirrored across the horizontal axis. FIG. 10 shows a first embodiment of a corner cup 1000 in accordance with the present disclosure. The corner cup 1000 comprises a base 1002, first and second trough 1004,1006, angled lip 1008, side wall 1010, rear wall 1012, wedge 1016, and rib system 1018 (including ribs 1018a, 1018b not depicted). The corner cup 1000 further comprises a hole 1020 (hole 1020a not depicted) for fasteners 1022 (fastener 1022a not depicted), and a third wall 1024 which forms the double L shape of the angled lip 1008 and side wall 1010.

The corner cups 100,1000 as shown in FIG. 1 and FIG. 10 are used in the bottom left and bottom right corners of the RV sealing system.

FIG. 9 is a side view of the Flip 'N Seal™ RV Sealing Bottom Pan 900 interacting with the angled lip of the corner cup 1000. Other seals may be used in combination with the corner cup 1000. Further, both the first and second corner cups 100, 1000 interact with the Flip 'N Seal™ RV Sealing Bottom Pan 900 in the same manner.

Second Embodiment

FIG. 13-20 depicts a second embodiment of the corner cup 1300. The elements of the second embodiment of the corner cup 1300 are similar to the corner cup 100, 1000 depicted in FIGS. 1 and 10 unless otherwise noted. Like numbered elements correspond to like numbered elements (i.e., 102, 1002, 1302 each identify a base).

The corner cup 1300 comprises a base 1302, first and second trough 1304, 1306, side wall 1310, rear wall 1312, wedge 1316, and rib system 1318.

The corner cup 1300 comprises a smooth, sloped base 1302. The base 1302 is comprised of a length, width, and thickness of material and is shaped to provide a seat for the slide out room. The base 1302 is a polygon having a top and bottom, as well as front, rear, left and right sides. The opposing left and right sides connect to a first and second trough 1304, 1306 respectively. The opposing rear and front sides connect to a rear wall 1312 and wedge 1316 respectively. The base 1302 is sloped to facilitate the movement of water away from the RV to prevent leaks. In alternative embodiments, the base 1302 is square or rectangular in shape. In alternative embodiments, the base 1302 lies flat along a horizontal axis without a slope.

The base 1302 of FIGS. 13-20 is comprised of a plastic, plastic resin, metal, metal alloy, composite, or combination thereof or other similarly situated materials. In an embodiment, the base 1302 is comprised of high-modulus plastic resin.

In the embodiment of FIGS. 13-20, the first and second troughs 1304, 1306 ensure that any residual water will be captured and run out of the cup. The troughs 1304, 1306 are recessed by slopes into opposing right and left sides of the horizontal base 1302 and create a channel for residual water to flow freely out of the RV sealing system. In an embodiment, the troughs 1304, 1306 are comprised of the same material as the base 1302.

In the embodiment of FIGS. 13-20, the rear side of the base 1302 connects to a rear wall 1312. The rear wall 1312 extends generally vertically from the horizontal plane of the base 1302. The distance between the front of the base 1302 and rear wall 1312 is sized to capture and drain runoff water for an RV slide out room system of all sizes. Generally, the base 1302 of the corner cup 1300 is long enough in length to extend from the exterior wall of the RV to the interior of the RV. In an embodiment, the rear wall 1312 is comprised of a single, straight-edged wall unit.

The rear wall 1312 of FIGS. 13-20 is comprised of a plastic, plastic resin, metal, metal alloy, composite, or combination thereof or other similarly situated materials. In an embodiment, the rear wall 1312 is comprised of high-modulus plastic resin.

In the embodiment of FIGS. 13-20, the base 1302 connects to a side wall 1310, which extends horizontally along the edge of the base 1302 and vertically in an upward direction before connecting to the rear wall 1312. In an embodiment, the side wall 1310 is larger in height than the rear wall 1312. In the preferred embodiment, the side wall 110 comprises a consistent length, width, and thickness.

The side wall 1310 of FIGS. 13-20 is comprised of a plastic, plastic resin, metal, metal alloy, composite, or combination thereof or other similarly situated materials. In an embodiment, the side wall is comprised of high-modulus plastic resin.

In the embodiment of FIGS. 13-20, the base 1302 connects to a wedge 1316 which comprises an L shape with one portion of the L connecting to the side wall 1312 near the front side of the base 1302 and one portion of the L connecting to the front side of the base 1302. The wedge 1316 includes a portion extending downward from the base 1302 and a portion extending horizontally away from the side wall 1310. The wedge 1316 is shaped to provide an end to the corner cup 1300 which allows the base 1302 to rest horizontally along the floor of the slide out column while the interior of the wedge 1316 is flush along the exterior walls of the RV.

The wedge 1316 of FIGS. 13-20 is comprised of a plastic, plastic resin, metal, metal alloy, composite, or combination thereof or other similarly situated materials. In an alternative embodiment, the wedge 1316 is comprised of high-modulus plastic resin.

In the embodiment of FIGS. 13-20, the bottom of the base 1302 comprises a rib system 1318 to ensure that the underside of the cup will be sloped away from the interior of the slide out room to ensure that water will not pool in the cup and will instead run out from the cup. The addition of the rib system 1318 achieves significant improvements in terms of strength and function of the corner cup 1300 and allows for universal application of the corner cup 1300, including with RV walls of greater than 2" in width. In particular, the waterless design, increased stiffness/durability and high compression strength for improved load bearing performance of the corner cup 1300 are the result of the rib system 1318.

The rib system 1318 comprises a plurality of raised protrusions 1318a extending from the bottom of the base 1302 and beginning from the front end of the base 1302, near the wedge 1316 side. The protrusions 1318a extend horizontally toward the rear side of the base 1302 and vertically in the downward direction. As the protrusions extend horizontally along the base 1302, the vertical extension of the protrusions 1318a increase in size, which form a triangular profile. The triangular profile provides a slope along the base 1302 when the corner cup is placed inside the RV. In an embodiment an additional protrusion 1318b extends beneath the second trough 1306 in the form of a quarter-circle profile. Similar to the triangular profile protrusions 1318a, the vertical extension of the additional protrusion 1318b increases in size as it extends horizontally along the base 1302. In an embodiment, the protrusions 1318a do not extend the entire length of the base 1302. In an alternative embodiment, the protrusions extend the entirety of the base 1302 toward the rear wall 1312. In a second alternative embodiment, the rib system 1318 comprises a single protrusion which extends the width of the bottom of the base portion 1302.

In the embodiment of FIGS. 13-20, the rib system 1318 comprises protrusions which form a triangular shape with the base 1302 of the corner cup 1300. In an alternative embodiment, protrusions of the rib system 1318 form a conic or semispherical shape extending from the base 1302 of the corner cup 1300.

The ribs 1318a, 1318b of the rib system 1318 of FIGS. 13-20 are comprised of a plastic, plastic resin, metal, metal alloy, composite, or combination thereof or other similarly situated materials. In an embodiment, the ribs 1318a, 1318b of the rib system 1318 are comprised of high-modulus plastic resin.

Figure 21:
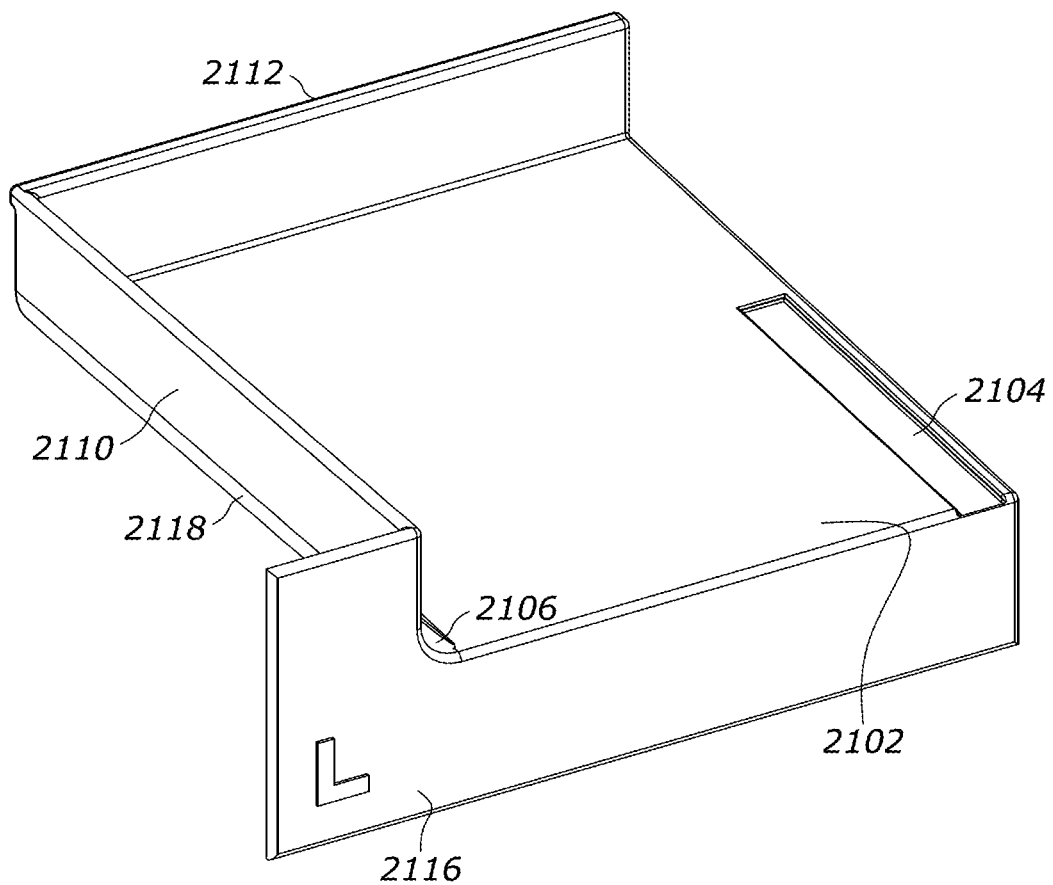
FIG. 21 is a perspective view of a second corner cup for use in a second, opposite corner of the RV.

FIG. 21 depicts a second corner cup 2100 for use in an opposite corner of the RV slide out room. The elements of the second corner cup 2100 are identical to the corner cup 1300 shown in FIG. 13, except the elements of the device are mirrored across the horizontal axis. FIG. 21 shows a companion embodiment of a corner cup 1300 in accordance with the present disclosure. The corner cup 2100 comprises a base 2102, first and second trough 2104, 2106, side wall 2110, rear wall 2112, wedge 2116, and rib system 2118 (including ribs 2118a, 2118b not depicted).

Figure 13:
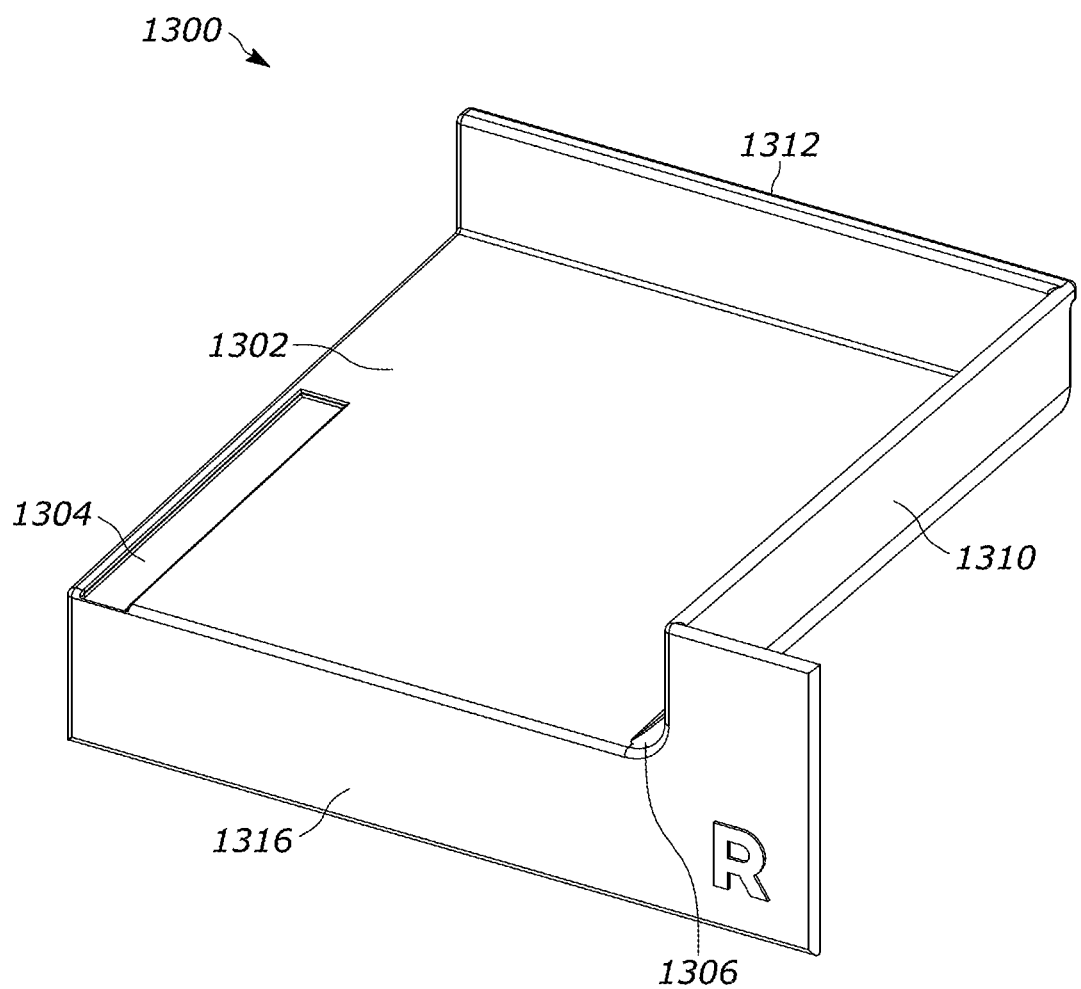
FIG. 13 is a perspective view of the corner cup in accordance with a second embodiment of the present disclosure.
Figure 14:
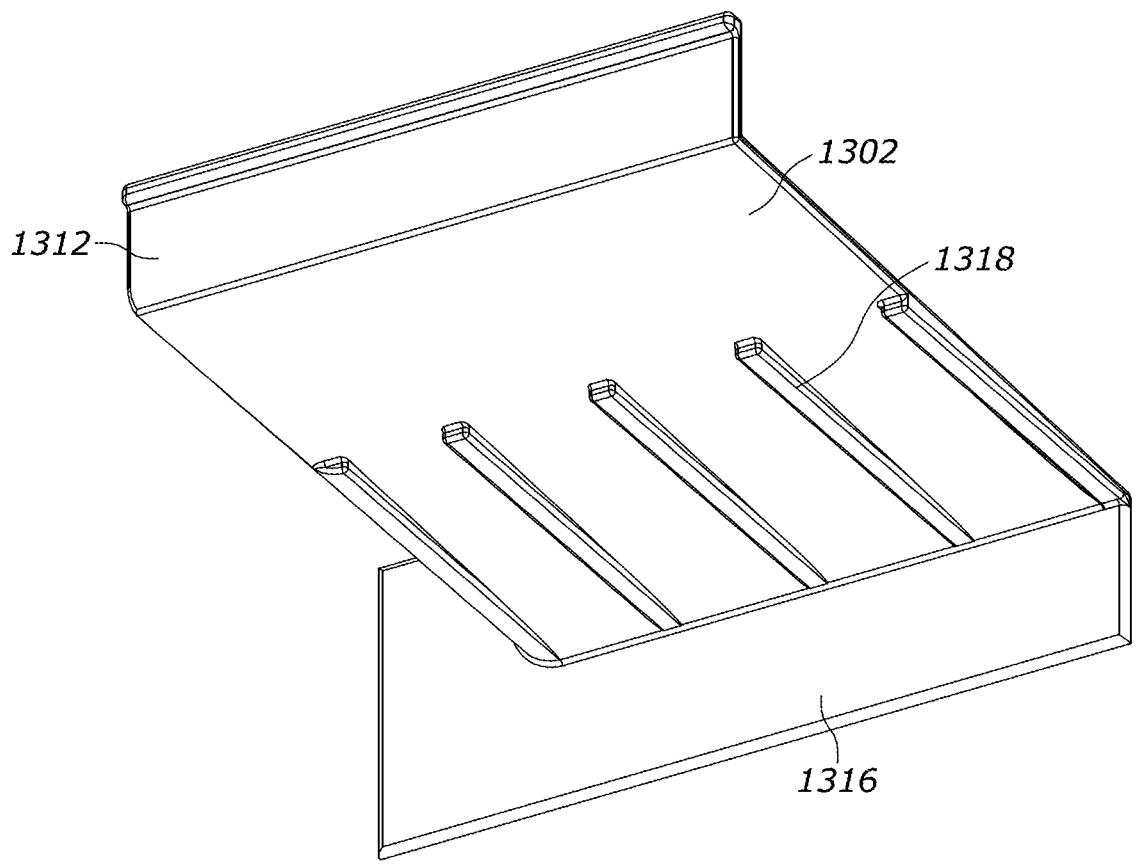
FIG. 14 is a second perspective view of the underside of the corner cup in accordance with a second embodiment of the present disclosure.
Figure 15:
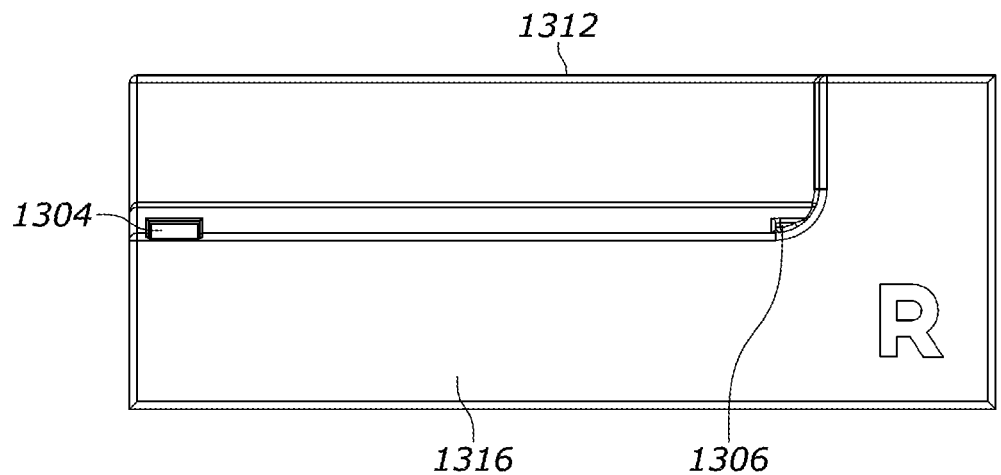
FIG. 15 is a front view of the corner cup shown in FIG. 13.
Figure 16:
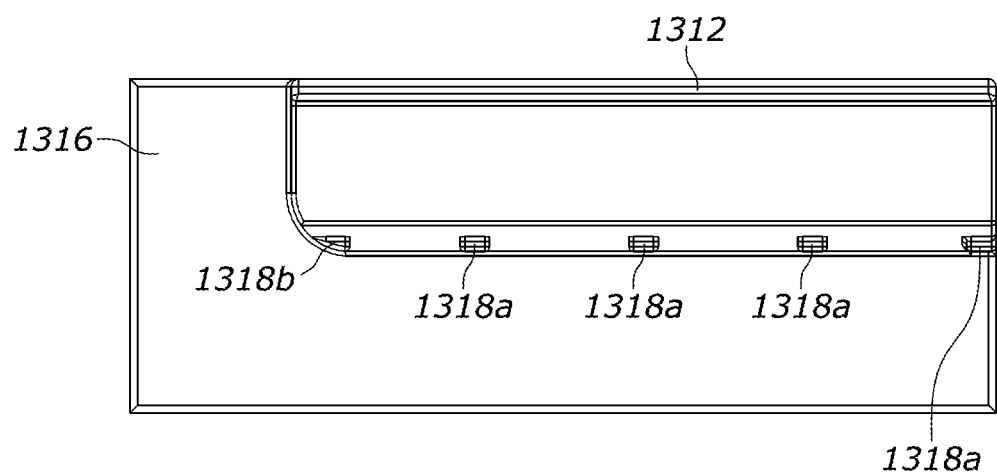
FIG. 16 is a rear view of the corner cup shown in FIG. 13.
Figure 17:
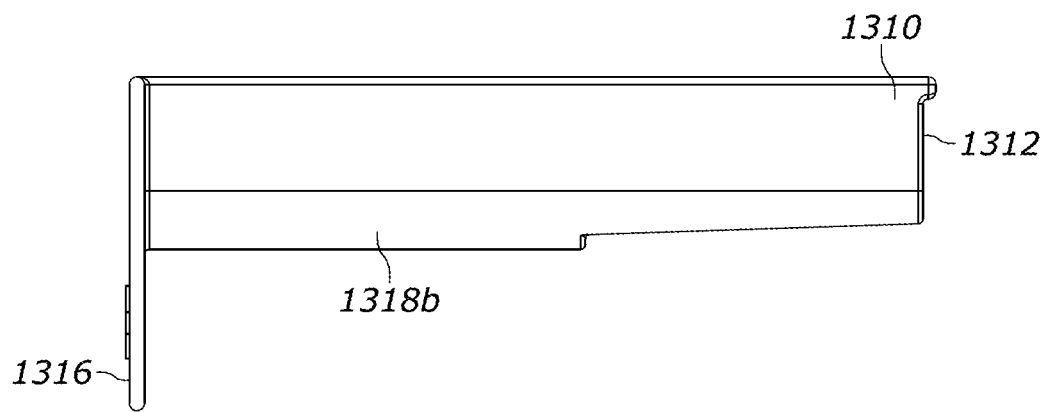
FIG. 17 is a side view of the corner cup shown in FIG. 13.
Figure 18:
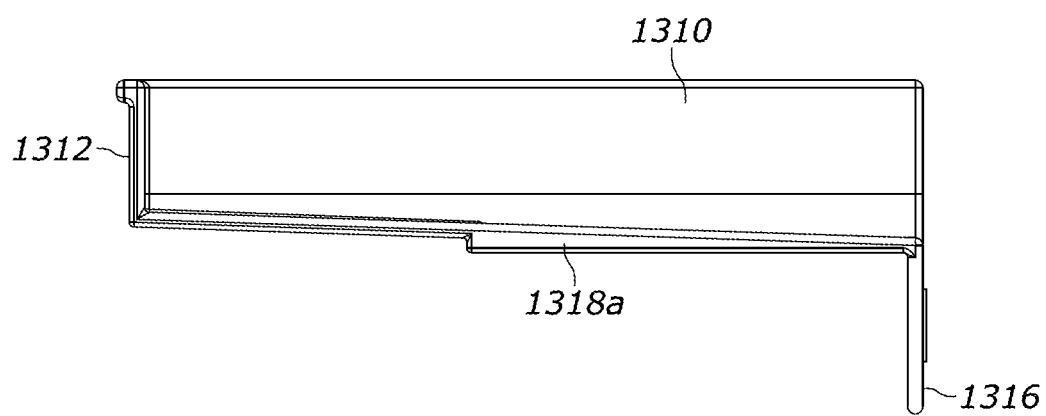
FIG. 18 is an opposite side view of the corner cup shown in FIG. 17.
Figure 19:
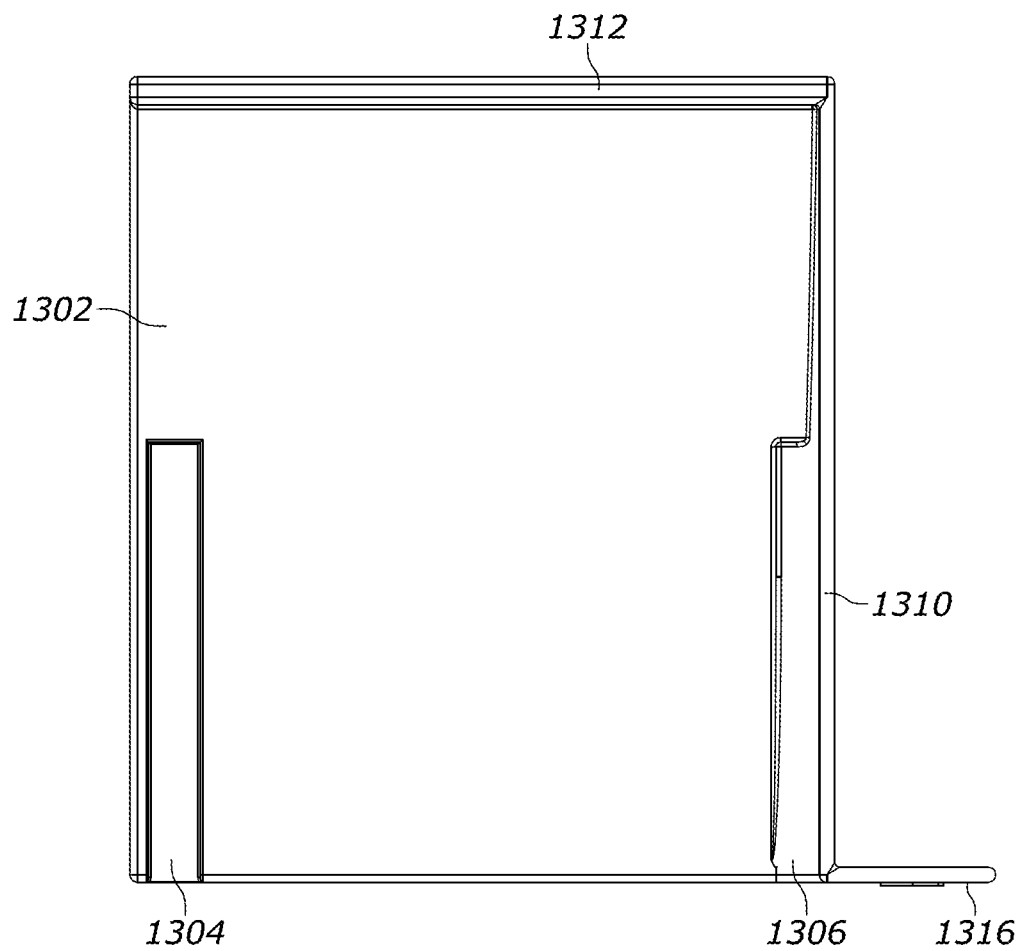
FIG. 19 is a top view of the corner cup shown in FIG. 13.
Figure 20:
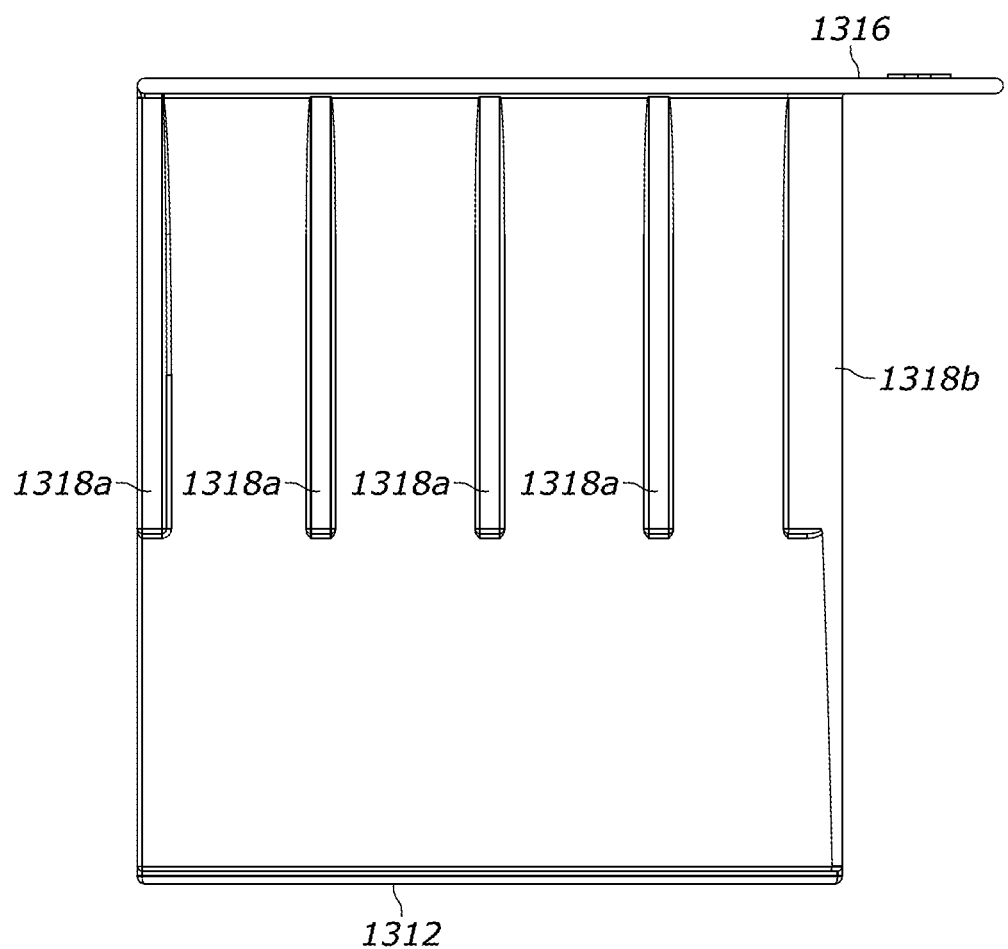
FIG. 20 is a bottom view of the corner cup shown in FIG. 13.

The corner cups 1300, 2100 as shown in FIG. 13 and FIG. 21 are used in the bottom right and bottom left corners of the RV sealing system respectively.

Method of Use/Application of the Corner Cup

Figure 11:
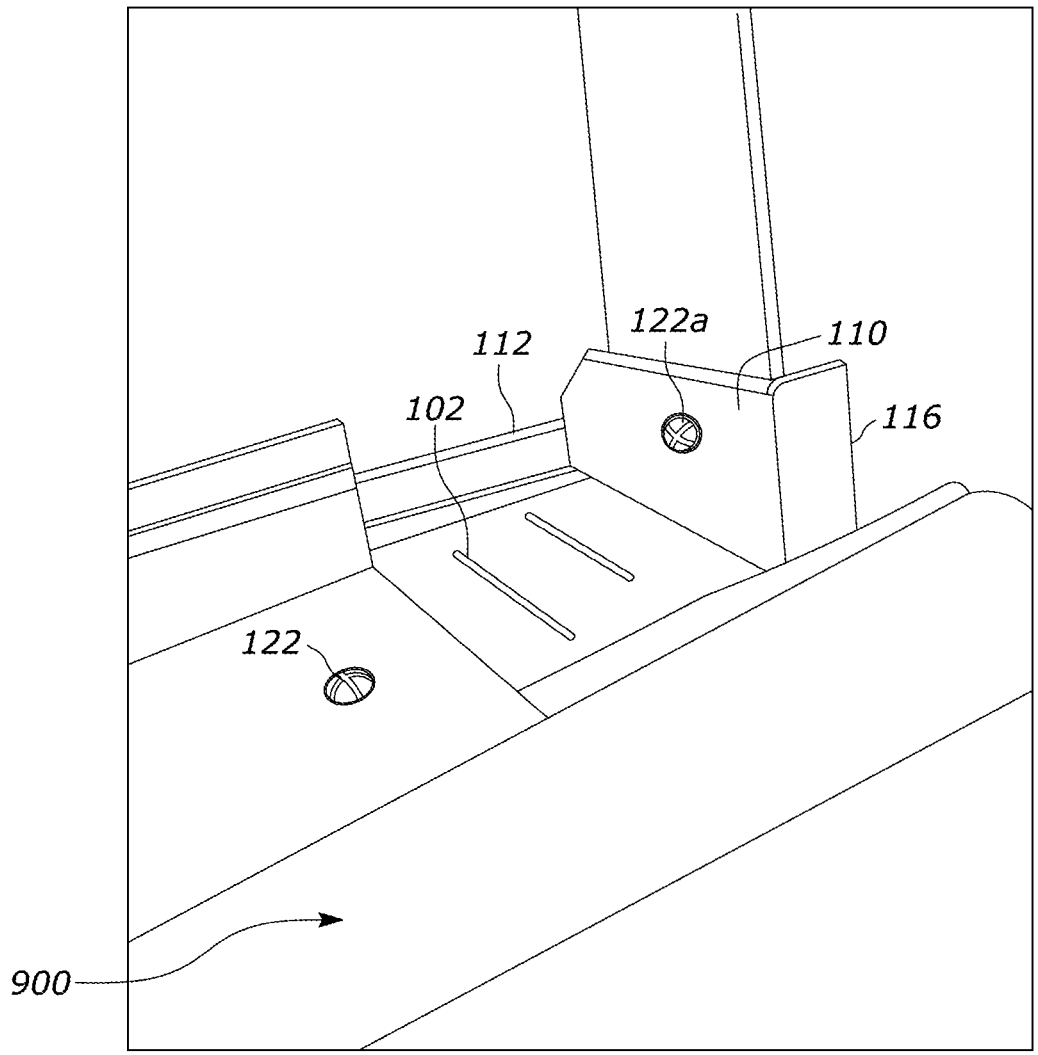
FIG. 11 is a perspective view of a corner cup in a corner of an RV with the slide out room removed from view.

FIG. 11 shows a corner cup 100 in a corner of the frame for an RV slide out room wherein the slide out portion has been removed from view. The elements of the corner cup 100 in FIG. 11 correspond to the corner cup shown in FIG. 1 and FIG. 10. The corner cups 100 are installed by attaching the corner cups to the bottom corners of an RV slide out room system. The side wall 110 of the corner cup 100 attaches to the side wall of the RV slide out room system. In a preferred embodiment, the corner cup 100 attaches to the RV slide out room system via holes 120, 120a and fasteners 122, 122a. Alternatively, the corner cup is installed without fastening means. The rear wall 112 is located proximate the interior of the RV and the front of the base 102 is located proximate exterior of the RV. A seal system 900 (such as the Flip 'N Seal™ RV Sealing Bottom Pan) may be installed with the corner cup to provide a seal for the RV.

Figure 12:
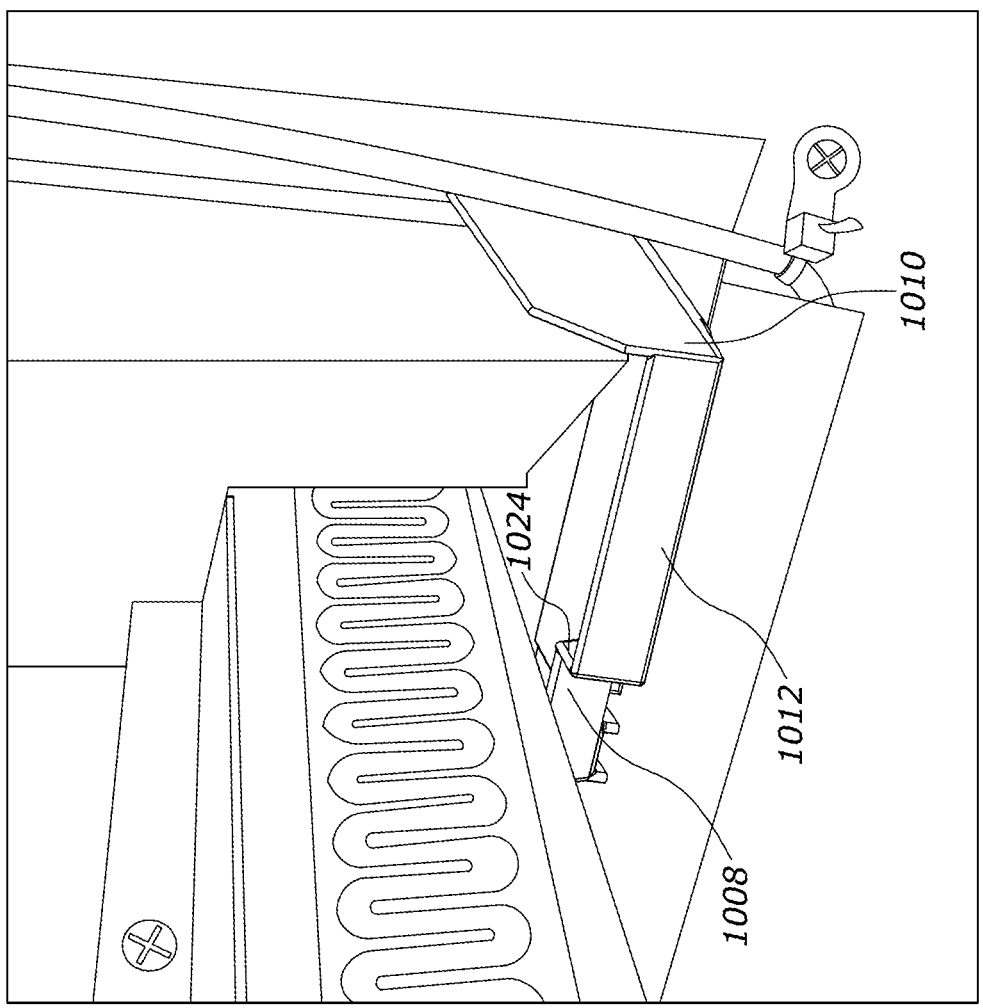
FIG. 12 is a rear view of a corner cup in use in an RV with the slide out room in a retracted state.

FIG. 12 shows a corner cup 100 in use in an RV with the slide out room in a retracted state. The elements of the corner cup 100 in FIG. 12 correspond to the corner cups 100 shown in FIG. 1 and FIG. 10. In rainy conditions, the RV slide out room may collect water along the exterior of the slide out room. When the RV slide out room is retracted within the RV, the corner cup catches the runoff water and drains the water outside the RV. The rear wall 112 and a rear portion of the side wall 110 are shown in FIG. 12.

Each embodiment of the corner cup 100, 1000, 1300, 2100 may be used in connection with the seal system 900 and RV slide out room in a similar manner.

The foregoing examples have been provided merely for the purpose of explanation, and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the field would be able to conceive of a wide variety of alternative configurations and successful combinations thereof. The selection of these and other details of construction are believed to be well within the ability of one of even rudimentary skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. All technical terms shall take on their customary meaning as established by the appropriate technical discipline utilized by those normally skilled in that particular area.

What is claimed is:

1. A corner cup to provide a seal for a slide out room of a recreational vehicle comprising:
    a base, with a top side, bottom side, front side, back side, and a pair of opposing sides;
    at least one recessed trough extending from the front side of the base toward the back side of the base;
    a side wall extending along a side of the base in a generally upward direction, the side wall connected to a rear wall proximate the back side of the base and connected to a wedge proximate the front side of the base;
    the rear wall, extending in a generally vertical direction from the back side of the base;
    the wedge, extending generally perpendicular from the base and the side wall, wherein the portion of the wedge connected to the sloped base extends in a downward direction and the portion of the wedge attached to the side wall extends away from the base and side wall; and
    a rib system extending in a downward direction from the bottom of the base, the rib system comprising at least one rib, and wherein the at least one rib increases in size as it extends along the bottom of the base.

2. The corner cup of claim 1, wherein the base comprises a first recessed trough and a second recessed trough positioned proximate opposing sides of the base.

3. The corner cup of claim 1, wherein the ribs provide a means for sloping the base of the corner cup, wherein the back side of the base is elevated slightly above the front side of the base.

4. The corner cup of claim 1, wherein the rear wall comprises a single straight-edge wall section.

5. The corner cup of claim 1, wherein the rear wall comprises a double L shape formed by multiple wall sections, wherein the rear wall forms a first wall portion and a second wall portion each located at different distances from the front of the base and each connected by a third wall portion.

6. The corner cup of claim 5, wherein the first wall portion and second wall portion of the rear wall are approximately the sum of the width of the base portion.

7. The corner cup of claim 5, wherein the second wall portion of the rear wall is located at a position closer to the front side of the base than the first wall portion and the second wall portion of the rear wall comprises an angled lip such that the top of the second wall portion is located further from the front side of the sloped base that the bottom of the second wall portion.

8. The corner cup of claim 1, wherein the base is approximately 2.0 to 3.0 inches in length from front to back.

9. The corner cup of claim 1, wherein the wedge extends along the entire width of the front side of the sloped base and the entire height of the side wall.

10. The corner cup of claim 1, wherein the corner cup is made of a plastic, a plastic resin, a metal, a metal alloy, a composite or combination thereof.

11. A method of sealing a slide out room of a recreational vehicle with a corner cup, comprising the steps of:
    installing a first corner cup within a first corner of a slide out room system of an RV;
    installing a second corner cup within a second corner of a slide out room system of an RV;
        wherein each of the installed first and second corner cups comprise:
        a base having a top side, bottom side, front side, back side, and pair of opposing sides;
        a first and second recessed trough, each positioned on opposing sides of the base;
        a side wall extending along the side of the base and connected to the interior wall of the RV slide out room system;
        a rear wall extending the width of the base and located proximate the interior of the RV;
        a wedge extending along the front side of the base and the side wall, the wedge having a front side and a back side, the back side of the wedge flush with the exterior walls of the RV; and
        a rib system extending from the bottom side of the base and flush with the floor of a slide out column of the RV slide out system.

* * * * *